(12) United States Patent
Pinzl

(10) Patent No.: US 6,702,503 B2
(45) Date of Patent: Mar. 9, 2004

(54) ATTACHMENT DEVICE FOR A COMPONENT TO BE ATTACHED TO A PLATE

(75) Inventor: Wilfried Pinzl, Tambach-Dietharz (DE)

(73) Assignee: EJOT Verbindungstechnik GmbH & Co. KB, Bad Laasphe (DE)

( * ) Notice: Subject to any disclaimer, the term of this patent is extended or adjusted under 35 U.S.C. 154(b) by 0 days.

(21) Appl. No.: 10/014,813

(22) Filed: Dec. 14, 2001

(65) Prior Publication Data

US 2002/0098063 A1 Jul. 25, 2002

(30) Foreign Application Priority Data

Dec. 15, 2000 (DE) ...................................... 200 21 221 U

(51) Int. Cl.$^7$ .............................. F16B 5/00; F16B 21/00
(52) U.S. Cl. ........................ 403/200; 403/187; 403/238; 403/348; 403/408.1; 411/353; 411/551
(58) Field of Search ................................ 403/187, 348, 403/349, 200, 201, 230, 238, 240, 188, 408.1, 4, 71, 83, 192, 193; 411/352, 353, 535, 536, 107, 553, 552, 551

(56) References Cited

U.S. PATENT DOCUMENTS

| | | | | |
|---|---|---|---|---|
| 2,940,784 A | * | 6/1960 | Fell | 74/89.35 |
| 4,108,407 A | * | 8/1978 | Cable et al. | 248/656 |
| 4,497,141 A | * | 2/1985 | Jarby | 451/342 |
| 4,906,152 A | | 3/1990 | Kurihara | |
| 5,624,221 A | * | 4/1997 | Poe | 411/383 |
| 6,059,502 A | | 5/2000 | Konig et al. | |
| 6,062,791 A | * | 5/2000 | Simon | 411/535 |
| 6,360,842 B1 | * | 3/2002 | Combest | 181/150 |
| 6,431,602 B1 | * | 8/2002 | Ralko et al. | 280/781 |
| 6,450,475 B1 | * | 9/2002 | Tsai et al. | 248/650 |
| 2003/0077118 A1 | * | 4/2003 | Kobusch et al. | 403/408.1 |

FOREIGN PATENT DOCUMENTS

| | | |
|---|---|---|
| DE | 93 18 122.1 | 3/1994 |
| DE | 298 05 045 | 7/1999 |

* cited by examiner

Primary Examiner—Lynne H. Browne
Assistant Examiner—Kenneth L Thompson
(74) Attorney, Agent, or Firm—Banner & Witcoff, Ltd.

(57) ABSTRACT

Attachment device for a component to be attached to a plate, which is three-dimensionally adjustable with respect to the plate. The attachment includes a sleeve which is inserted into an opening of the plate and locked with respect to the plate by means of rotation. A tubular piece with a through hole is screwed into the sleeve into which a screw is inserted with substantial positive allowance for radial adjustability. This screw rests with its head at one end of the tubular piece and supports with its threaded part the component which abuts to the other end of tubular piece which, for axial adjustment, is optionally far screwed in.

3 Claims, 2 Drawing Sheets

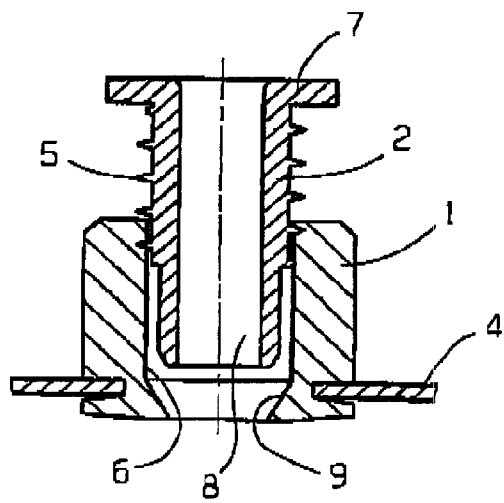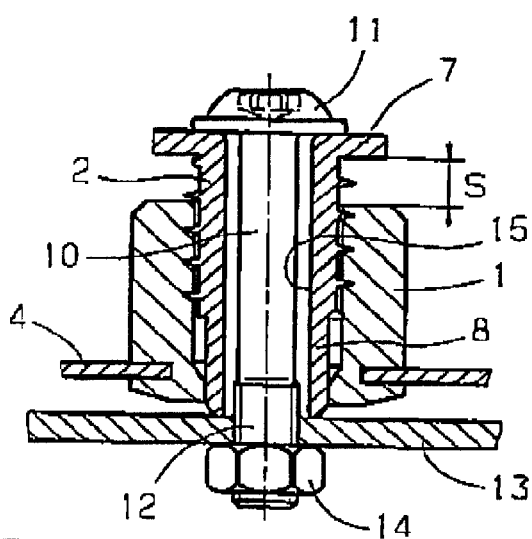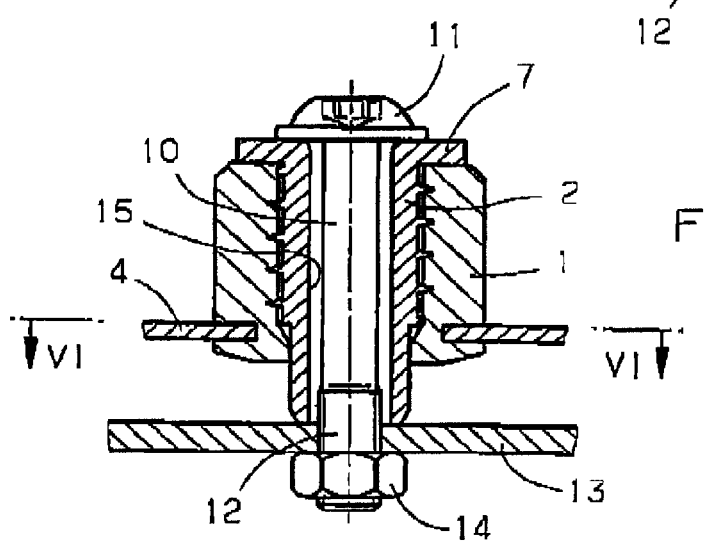

ATTACHMENT DEVICE FOR A COMPONENT TO BE ATTACHED TO A PLATE

Figure 4:
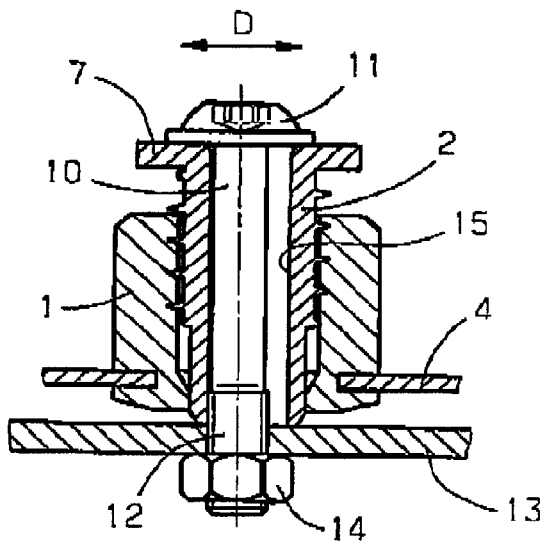

The invention relates to an attachment device for a component to be attached to a plate, being three-dimensionally adjustable by rotation, with respect to the plate having a sleeve being inserted into an opening in tie plate and locked with respect to the plate by rotation Such an attachment device is known from the German Utility Model 29805045.5. On the sleeve of the latter, a groove is formed in which the plate is received, holding the attachment device. A non-circular opening is provided in the plate into which the sleeve is inserted fitting with its outer profile into the opening, and being lockable within the latter by means of rotation relative to the plate. This locking results thereby that sections of the sleeve during their rotation relative to the plate protrude over the latter from one side as well as from the other side of the plate, and thus form the necessary long with respect to the plate.

The invention is based on the object to provide an attachment device such that it allows for an attachment of a component which is three-dimensionally adjustable with respect to the plate. According to the invention this results thereby that a tube piece having all opening is screwed into the sleeve into which a screw is inserted with substantial positive allowance for radial adjustment which is supported with its head on one end of the tube piece, arid with its threaded part supports the component which rests against the other end of the tubular piece being optionally far screwed in for axial adjustment.

On the one hand, the tubular piece screwed into the sleeve allows for the insertion of a screw with substantial positive allowance in the through hole such that the screw is displaceable within the through bole radially, whereby a corresponding radial adjustability for the screw results in the circumference of the positive allowance. The component is then screwed into the tubular piece with the screw whereby an axial adjustability results therefrom such that the tubular piece can be screwed into the sleeve optionally far into it. The axial adjustability of the screwed component follows from the screwing depth of the tubular piece. In this manner, the attachment device allows for an attachment of a component to a plate whereby the component can be displaced and attached in radial as well as in axial direction up to a substantial extent.

The tubular piece can be advantageously used to clamp tie sleeve additionally with respect to a plate, for which the tubular piece with its side facing the component pushes the sleeve apart. The tubular piece screwed into the sleeve serves for the purpose that the sleeve is securely held by the plate. Advantageously, the tubular piece is designed for this such that it has, at its side facing the component, an unthreaded section.

For screwing of the sleeve and tubular piece, the tubular piece is advantageously provided with a self-cutting external thread.

Figure 5:
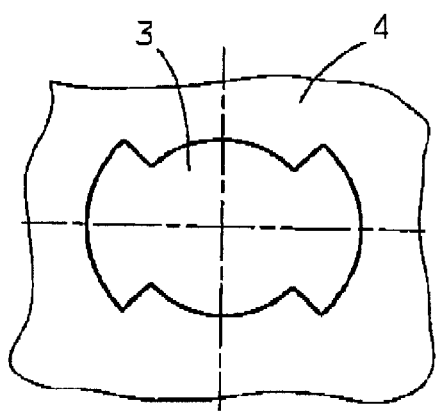
Figure 6:
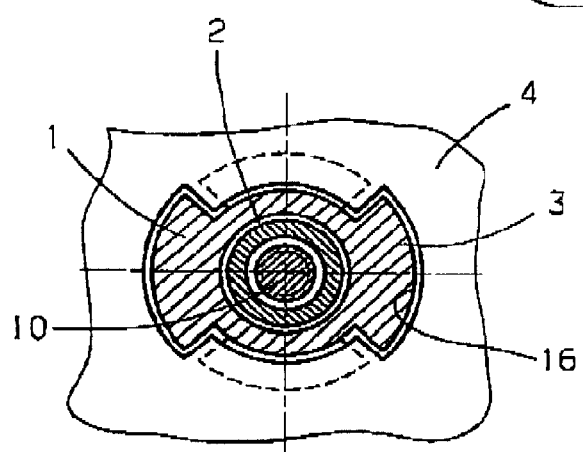

In the Figures, an embodiment of the invention is illustrated, showing:

FIG. 1 a longitudinal section of the attachment device with a tubular piece being additionally screwed into the sleeve incompletely, FIG. 2 the attachment device with the tubular piece being screwed in with approximately proximately ⅔ of its length at an intermediate position of the screw, FIG. 3 the arrangement according to FIG. 2 with the tubular piece being screwed into the sleeve completely, FIG. 4 the same arrangement with the screw being laterally radial displaced with respect to the screw hole, FIG. 5 the opening in the plate, FIG. 6 the cross-section along the line VI—VI of FIG. 3 for illustration of the locking of the sleeve with respect to the plate.

In FIG. 1, the attachment device with sleeve 1 and tubular piece 2 is illustrated whereby the tubular piece 2 is shown in a position being screwed into sleeve 1 incompletely. Sleeve 1 is inserted into a through hole 3 (see FIGS. 5 and 6) of the plate 4. The tubular piece 2 has an external thread 5, by means of which the tubular piece 2 is to be screwed into the boring 6 of the sleeve self-cuttingly. The tubular piece 2 has at its upper end a flange 7 which, as can be seen from FIG. 3, forms an abutment when screwed into tubular piece 2 completely. Moreover, flange 7 serves for setting a tool for the purpose of screwing the tubular piece into sleeve 1 for which e.g. a hexagon insert bit or a hexagon socket can serve. At its end facing away from flange 7, the tubular piece 2 further is provided with a non-threaded section 8, cooperating with the inner cone 9 of sleeve 1. Upon further screwing of the tubular piece 2 into sleeve 1, the section 8 pushes the inner cone 9 apart, from which a clamping of the sleeve 1 relative to the plate 4 results. For providing the hereto necessary flexibility to the corresponding part of the sleeve 1, the latter can be provided with radial grooves in the region of the inner cone 9 which facilitate the extension of the respective part of the sleeve 1.

FIG. 2 shows the attachment device according to FIG. 1 with, in comparison to the illustration of FIG. 1, the tubular piece 2 being further screwed in. Thereby, FIG. 2 shows the attachment device in a position in which the tubular piece 2 is screwed into the sleeve 1 just that far that the tubular piece 2 protrudes with its side facing away from flange 7 slightly beyond the side of sleeve 1 facing away from flange 7.

A comparison of FIG. 2 to FIG. 3 shows that for the screwing in of tubular piece 2 into sleeve 1 a positive allowance S exists which is available for the axial adjustment of the attachment device.

According to FIG. 2, screw 10 is inserted into the tubular piece 2 which rests with its head 11 against flange 7. The threaded part 12 of screw 10 is inserted into component 13 to be attached to plate 4, and is screwed into nut 14 by which component 13 is pushed against the corresponding end of tubular piece 2. Thus, the attachment of component 13 by means of the illustrated attachment device on plate 4 results.

In FIG. 3, the attachment device according to FIG. 2 is shown in a modified position, and, in fact, according to FIG. 3, the tubular piece 2 is screwed into sleeve 1 with flange 7 abutting against sleeve 1. With this tubular piece 2 takes the opposite extreme position compared to the illustration of FIG. 2. i.e. the adjusting distance S shown in FIG. 2 is reduced according to the position of FIG. 3 to the value 0. With a comparison of FIGS. 2 and 3, it follows offhand that due to the screwing with respectively different depths of tubular piece 2 into sleeve 1, a closer or a more distant position of the component 13 relative to plate 4 results whereby also an axial adjusting possibility with respect to screw 10 is enabled which, of course, also allows for a position of tubular piece 2 relative to sleeve 1 in which the tubular piece 2 is approximately in an intermediate position between the illustrated positions of FIGS. 2 and 3.

In FIGS. 2 and 3, the screw 10 is indicated respectively central-symmetrically within through hole 15 of sleeve 2. In FIG. 4 a radially displaced position of screw 10 compared to the latter is shown, in which screw 10 uses practically the positive allowance completely provided by the size of the through bole 15. The positive allowance is indicated by the double arrow D above head 11. This positive allowance of screw 10 in through hole 15 of tubular piece 2 provides a necessary radial positive allowance for screw 10 according to which opponent 13 respectively being displaced accordingly in relation to plate 4 can be attached to the latter.

In FIG. 5, plate 4 is shown only with opening 3 which, due to its non-circular shape, allows for a locking of sleeve 1 to plate 4. For this, sleeve 1, as shown in FIG. 6, has a profile 16 adapted to 1 rough hole 3, which allows for sleeve 1 to be inserted in correct position with respect to through hole 3 in plate 4, and thereafter to be rotated around approximately 90° with respect to plate 4 whereby the locking of sleeve 1 relative to plate 4 is achieved.

What is claimed is:

1. Attachment device for a component (13) to be attached to a plate (4), which is three-dimensionally adjustable with respect to the plate (4), having a sleeve (1) which is inserted into an opening (3) of the plate (4) and which is locked with respect to the plate by means of rotation, characterized in that a tubular piece (2) with a through hole (15) is screwed into the sleeve (1) into which a screw (10) is inserted with substantial positive allowance for radial adjustability which rests with its head (11) at one end of the tubular piece, and with its threaded part (12) supports the component (13) which abuts to the other end of tubular piece (2) which, for axial adjustment, is optionally far screwed in, and in that the tubular piece (2) with its side facing the component (13) pushes the sleeve (1) apart for a clamping with respect to the plate (4).

2. Attachment device according to claim 1, characterized in that the tubular piece (2) has a non-threaded section (8) on its side facing the component (4).

3. Attachment device according to claim 1 or 2, characterized in that the tubular piece (2) has a self-cutting external thread (5).

* * * * *